(12) United States Patent
Woo et al.

(10) Patent No.: US 10,700,342 B2
(45) Date of Patent: Jun. 30, 2020

(54) CATHODE CONTAINING SOLID SUPERACID AND LITHIUM-SULFUR SECONDARY BATTERY INCLUDING THE SAME

(71) Applicant: Korea Electronics Technology Institute, Seongnam-si (KR)

(72) Inventors: Sang-Gil Woo, Suwon-si (KR); Je-Nam Lee, Seongnam-si (KR); Ji-Sang Yu, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 165 days.

(21) Appl. No.: 16/103,044

(22) Filed: Aug. 14, 2018

(65) Prior Publication Data
US 2019/0051886 A1 Feb. 14, 2019

(30) Foreign Application Priority Data

Aug. 14, 2017 (KR) .......................... 10-2017-0103002

(51) Int. Cl.
| | |
|---|---|
| H01M 4/38 | (2006.01) |
| H01M 4/131 | (2010.01) |
| H01M 10/052 | (2010.01) |
| H01M 4/13 | (2010.01) |
| H01M 4/02 | (2006.01) |
| H01M 4/62 | (2006.01) |

(52) U.S. Cl.
CPC ............ *H01M 4/131* (2013.01); *H01M 4/13* (2013.01); *H01M 4/38* (2013.01); *H01M 10/052* (2013.01); *H01M 4/625* (2013.01); *H01M 2004/027* (2013.01); *H01M 2004/028* (2013.01)

(58) Field of Classification Search
None
See application file for complete search history.

(56) References Cited

FOREIGN PATENT DOCUMENTS

| CN | 105047889 A | 11/2015 |
|---|---|---|
| KR | 10-2004-0067030 A | 7/2004 |
| KR | 10-2014-0082189 A | 7/2014 |

OTHER PUBLICATIONS

Hweng, KR 10-2004-0067030, machine translation (Year: 2004).*
(Continued)

*Primary Examiner* — Wojciech Haske
(74) *Attorney, Agent, or Firm* — NSIP Law (57) ABSTRACT

The present invention relates to a cathode containing a solid superacid to improve the electrochemical properties and lifetime properties of the cathode using sulfur as an active material, and to a lithium-sulfur secondary battery including the cathode. According to an embodiment, a cathode for a lithium-sulfur secondary battery contains sulfur and a solid superacid. Since the solid superacid in the cathode does not affect the electrochemical properties of the cathode containing sulfur, it is possible to utilize sulfur itself as the cathode active material without technical processing. As a result, it is possible to minimize a reduction in the energy density of the lithium-sulfur secondary battery. In addition, the solid superacid in the cathode can improve the long-term lifetime properties of the lithium-sulfur secondary battery by controlling the polysulfide which is an intermediate product of the charging and discharging reactions of lithium and sulfur.

12 Claims, 6 Drawing Sheets

(56) References Cited

OTHER PUBLICATIONS

Kim et al. KR 10-2014-0082189, machine translation (Year: 2014).*
Korean Office Action dated Oct. 18, 2018 in Korean Patent Application No. 10-2017-0103002 (6 pages in Korean).
Woo et al., "Surface modification by sulfated zirconia on high-capacity nickel-based cathode materials for Li-ion batteries," Electrochimica Acta, Jan. 20, 2015, pp. 115-121 (7 pages in English).
Korean Office Action dated Jul. 3, 2019 in corresponding Korean Patent Application No. 10-2017-0103002 (6 pages in Korean).

* cited by examiner

CATHODE CONTAINING SOLID SUPERACID AND LITHIUM-SULFUR SECONDARY BATTERY INCLUDING THE SAME

CROSS-REFERENCE TO RELATED APPLICATIONS

This application claims the benefit under 35 USC § 119(a) of Korean Patent Application No. 10-2017-0103002 filed on Aug. 14, 2017 in the Korean Intellectual Property Office, the entire disclosure of which is incorporated herein by reference for all purposes.

TECHNICAL FIELD

The present invention relates to a lithium secondary battery. Particularly, the present invention relates to a cathode containing a solid superacid to improve the electrochemical properties and lifetime properties of the cathode using sulfur as an active material, and to a lithium-sulfur secondary battery including the cathode.

BACKGROUND

With the growth of technology related to electronic devices, there is an increasing demand for a small, thin, lightweight and high-capacity battery in the market. Also, coping with the development of electric vehicles or fuel cell vehicles, a battery adapted to a vehicle is required.

A lithium-based secondary battery which is one of rechargeable batteries is being widely used for a great variety of portable electronic devices such as a mobile phone, a notebook computer, a small video camera, and the like. Normally, a lithium secondary battery is composed of a cathode (positive electrode), an anode (negative electrode), and an electrolyte. In the lithium secondary battery, lithium ions move from a cathode active material to an anode active material during charge, and the reverse process occurs during discharge. While moving between the electrodes during charge and discharge, lithium ions transfer electrical energy.

A typical lithium secondary battery has, however, some problems such as safety lowering due to overheating, a low energy density of about 360 Wh/kg, and a low power output.

In order to solve such problems of a typical lithium secondary battery, a lithium-sulfur secondary battery capable of realizing a high energy density and a high power output are being developed. Because of using sulfur, as a cathode active material, having a high capacity per mass, the lithium-sulfur secondary battery can realize a high energy density.

The lithium-sulfur secondary battery has, however, a problem that polysulfide which is an intermediate product of lithium and sulfur flows into the electrolyte during subsequent charge/discharge reactions. This causes a capacity reduction due to a continuous loss of a reversible sulfur active material, a self-discharge due to a shuttle reaction of the polysulfide in the electrolyte, and a formation of a high resistance film at extraction on an anode surface, thereby deteriorating the long-term lifetime properties of the lithium-sulfur secondary battery.

As a solution of these problems, many techniques for inserting sulfur into a porous carbon nanostructure having a high electrical conductivity and a large internal space have been developed. These techniques are to restrict a movement of the polysulfide produced during the charge/discharge reactions within the structure, thereby minimizing the occurrence of the above problems and improving the long-term lifetime properties of the lithium-sulfur secondary battery.

However, the porous carbon nanostructure has difficulty in increasing an inner pore, so that there is a limit to increase the content of sulfur inserted into the porous carbon nanostructure. As a result, even though having an advantage of improving the long-term lifetime properties of the lithium-sulfur secondary battery, the carbon nanostructure technology is disadvantageous in energy density as compared with a lithium-sulfur secondary battery including a cathode using sulfur itself as an active material.

SUMMARY

Accordingly, it is an object of the present invention to provide a cathode containing a solid superacid and a lithium-sulfur secondary battery including the same, which can increase the sulfur content in the cathode and also suppress the influence of polysulfide which is an intermediate product.

According to embodiments of the present invention, a cathode for a lithium-sulfur secondary battery contains sulfur and a solid superacid.

In the cathode, the solid superacid may be contained with a weight percent of 1 to 10 and may be a powder having a particle size of 3 micrometers or less.

In the cathode, the sulfur may be contained with a weight percent of 50 to 80.

The cathode may further contain a conductive material with a weight percent of 7 to 25 and a binder with a weight percent of 7 to 25.

In the cathode, the solid superacid may include sulfated zirconia, sulfated titanium dioxide, sulfated tin dioxide, or sulfated aluminum oxide.

According to embodiments of the present invention, a cathode structure for a lithium-sulfur secondary battery comprises a current collector and a cathode formed on the current collector and containing sulfur and a solid superacid.

According to embodiments of the present invention, a lithium-sulfur secondary battery comprises a cathode containing sulfur and a solid superacid.

According to the present invention, since the cathode for the lithium-sulfur secondary battery contains a solid superacid in addition to sulfur, it is possible to improve the long-term lifetime properties of the lithium-sulfur secondary battery while utilizing sulfur itself as a cathode active material without technical processing.

That is, since the solid superacid in the cathode does not affect the electrochemical properties of the cathode containing sulfur, it is possible to utilize sulfur itself as the cathode active material without any technical processing. As a result, it is possible to minimize a reduction in the energy density of the lithium-sulfur secondary battery.

In addition, the solid superacid in the cathode can improve the long-term lifetime properties of the lithium-sulfur secondary battery by controlling the polysulfide which is an intermediate product of the charging and discharging reactions of lithium and sulfur.

DETAILED DESCRIPTION

Hereinafter, embodiments of the present invention will be described in detail with reference to the accompanying drawings.

In the following description of embodiments, techniques that are well known in the art and not directly related to the present invention are not described. This is to clearly convey the subject matter of the present invention by omitting an unnecessary explanation. For the same reason, some elements in the drawings are exaggerated, omitted, or schematically illustrated. Also, the size of each element does not entirely reflect the actual size.

In addition, terms used herein are defined in consideration of functions of this invention and may be varied depending on a user or an operator's intention or custom. Therefore, the definition should be made based on the contents throughout this description.

According to embodiments of the present invention, a cathode for a lithium-sulfur secondary battery contains sulfur and a solid superacid and may further contain a conductive material and a binder. The cathode may include the solid superacid with a weight percent of 1 to 10, the sulfur with a weight percent of 50 to 80, the conductive material with a weight percent of 7 to 25, and the binder with a weight percent of 7 to 25. The solid superacid may be a powder having a particle size of several micrometers, for example, 3 micrometers or less.

The reason why the solid superacid is contained in the sulfur-based cathode is that it can improve the long-term lifetime properties of the lithium-sulfur secondary battery while utilizing sulfur itself as a cathode active material without technical processing. That is, since the solid superacid in the cathode does not affect the electrochemical properties of the cathode containing sulfur, it is possible to utilize sulfur itself as the cathode active material without any technical processing. As a result, it is possible to minimize a reduction in the energy density of the lithium-sulfur secondary battery. In addition, the solid superacid in the cathode can improve the long-term lifetime properties of the lithium-sulfur secondary battery by controlling the polysulfide which is an intermediate product of the charging and discharging reactions of lithium and sulfur.

The conductive material is used to obviate a problem caused by low electrical conductivity of sulfur. However, if the amount of the conductive material included in the cathode is excessively large, aggregation of the conductive material may occur due to deterioration of dispersion characteristics, and the energy density of the entire battery may be lowered.

As the conductive material, various materials may be used. For example, graphite such as natural graphite or artificial graphite may be used as the conductive material. For example, carbon black, acetylene black, ketjen black, channel black, furnace black, lamp black, or thermal black may be used as the conductive material. For example, conductive fiber such as carbon fiber or metallic fiber may be used as the conductive material. For example, metal powder such as carbon fluoride powder, aluminum powder, or nickel powder may be used as the conductive material. For example, conductive whisker such as zinc oxide or potassium titanate may be used as the conductive material. For example, a conductive metal oxide such as titanium oxide may be used as the conductive material. For example, any conductive material such as polyaniline, polythiophene, polyacetylene, polypyrrole, or polyphenylene derivative may be used. However, the conductive material is not limited to the above examples.

As the binder, a material having excellent dispersibility with respect to the conductive material and being capable of stably attaching the cathode to the current collector may be used. For example, a fluorine-based, rubber-based, or acrylate-based binder may be used. However, the binder is not limited to these examples. The amount of the binder may be within a range that does not lower the energy density of the entire battery without causing aggregation of the conductive material.

The solid superacid has higher acid strength than that of a 100% sulfuric acid. As the solid superacid, sulfated zirconia, sulfated titanium dioxide, sulfated tin dioxide, or sulfated aluminum oxide may be used. However, the solid superacid is not limited to these examples. The sulfated zirconia is zirconia ($ZrO_2$) whose solid particle surface is modified with a sulfuric acid group ($SO_4^{2-}$). The sulfated titanium dioxide is titanium dioxide ($TiO_2$) whose solid particle surface is modified with a sulfuric acid group ($SO_4^{2-}$). The sulfated tin dioxide is tin dioxide ($SnO_2$) whose solid particle surface is modified with a sulfuric acid group ($SO_4^{2-}$). The sulfated aluminum dioxide is aluminum oxide ($Al_2O_3$) whose solid particle surface is modified with a sulfuric acid group ($SO_4^{2-}$).

Figure 1:
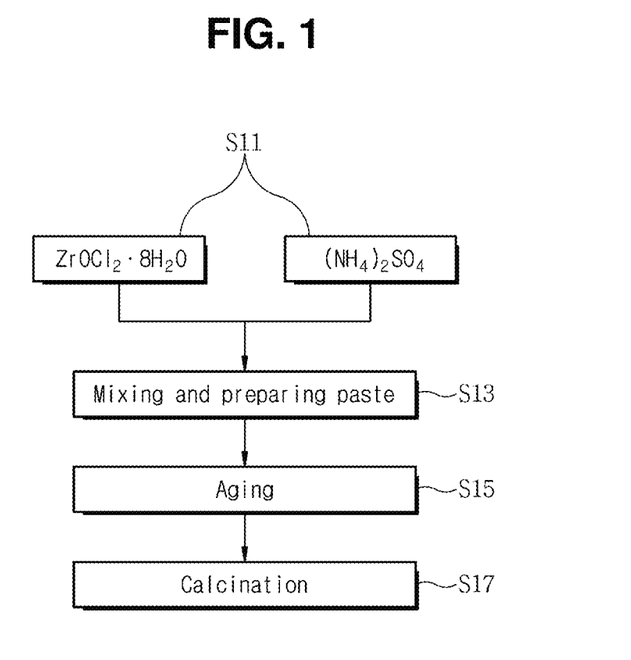
FIG. 1 is a flow diagram illustrating a method of manufacturing a solid superacid contained in a cathode for a lithium-sulfur secondary battery according to the present invention.

The sulfated zirconia may be manufactured by a method as shown in FIG. 1. FIG. 1 is a flow diagram illustrating a method of manufacturing a solid superacid contained in a cathode for a lithium-sulfur secondary battery according to the present invention.

First, at step S11, $ZrOCl_2 \cdot 8H_2O$ and $(NH_4)_2SO_4$ are prepared as raw materials for manufacturing the sulfated zirconia.

Next, at step S13, $ZrOCl_2 \cdot 8H_2O$ of 25 to 30 wt % and $(NH_4)_2SO_4$ of 70 to 75 wt % are poured into a container and then mixed for 30 minutes to prepare a paste.

Then, at step S15, the prepared paste is aged at 25° C. for 18 hours or more.

Then, at step S17, the aged paste undergoes calcination at 600° C. for 5 hours to obtain the sulfated zirconia. Here, the calcination may proceed in an air flow atmosphere.

Figure 2:
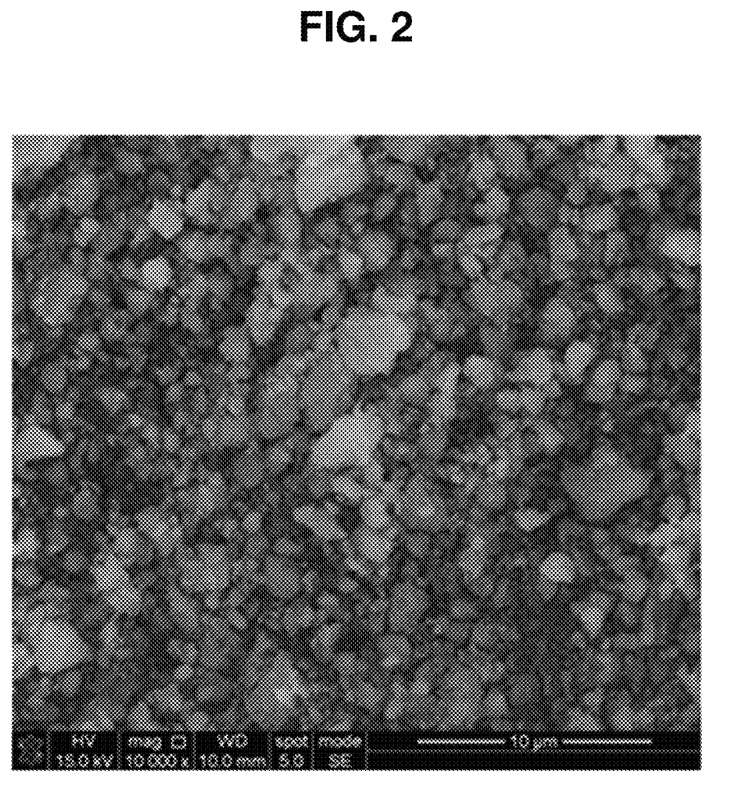
FIG. 2 is a SEM photograph of the solid superacid manufactured by the method shown in FIG. 1.

FIG. 2 is a SEM photograph of the solid superacid manufactured by the method shown in FIG. 1.

As seen from FIG. 2, the solid superacid manufactured by the method of FIG. 1 is a powder having a uniform particle size of 3 μm or less.

Figure 3:
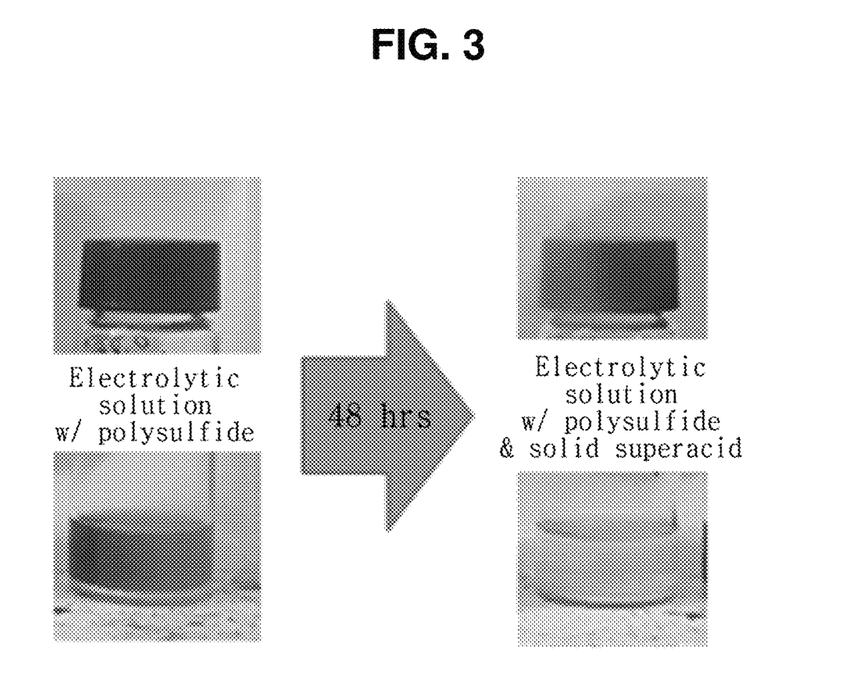
FIG. 3 is a photograph showing a change in color before and after the solid superacid manufactured by the method shown in FIG. 1 is added to an electrolytic solution containing polysulfide.

Before evaluating the electrochemical properties and long-term lifetime properties of the lithium-sulfur secondary battery according to the present invention, an experiment for verifying a polysulfide control capability of the solid superacid was carried out as shown in FIG. 3. FIG. 3 is a photograph showing a change in color before and after the solid superacid manufactured by the method shown in FIG. 1 is added to an electrolytic solution containing polysulfide.

As shown in FIG. 3, the solid superacid was added to an electrolytic solution in which polysulfide was dissolved, and after storage for 48 hours, a color change was observed. As a result of comparison in the color of the electrolytic solution before and after storage for 48 hours, it was observed that the color of the electrolytic solution was cleaner after storage. This means that polysulfide was controlled by the solid superacid.

Thereafter, in order to evaluate the electrochemical properties and long-term lifetime properties of the lithium-sulfur secondary battery according to the present invention, lithium-sulfur secondary batteries according to an embodiment and a comparative example were obtained as follows.

In an embodiment, sulfur and a solid superacid were mixed uniformly and physically, and then a conductive material and a binder were added thereto. Then, through a typical method, a cathode containing the solid superacid was obtained. Specifically, a slurry was prepared by dissolving sulfur of 55 wt %, a solid superacid of 5 wt %, ketjen black of 20 wt % as a conductive material, and polyethylene oxide (PEO) of 20 wt % as a binder in acetonitrile (ACN). The prepared slurry was applied to an aluminum foil having a thickness of 20 μm, dried, and compacted by a press. Then, the slurry was dried in vacuum at 60° C. for 12 hours. As a result, a working electrode (cathode) was obtained in the form of a disc having a diameter of 12 mm.

Figure 4:
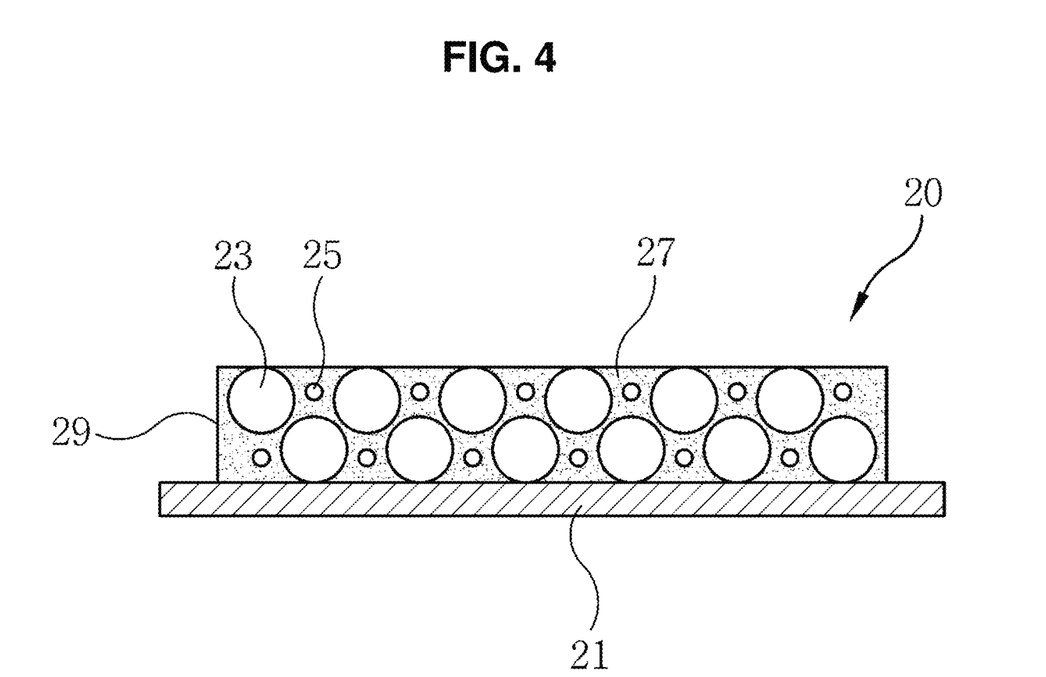
FIG. 4 is a cross-sectional view showing a cathode structure for a lithium-sulfur secondary battery according to the present invention.

The obtained working electrode may have a structure as shown in FIG. 4. FIG. 4 is a cross-sectional view showing a cathode structure 20 for a lithium-sulfur secondary battery according to the present invention.

As shown in FIG. 4, the cathode structure 20 includes a current collector 21 and a cathode 29. The cathode 29 is formed on the current collector 21 and contains sulfur 23 and a solid superacid 25. The current collector 21 may be an aluminum foil. A reference numeral 27 denotes a conductive material and a binder that form the cathode 29.

On the other hand, a cathode (working electrode) according to a comparative example was prepared through the same method as the above-described method of the embodiment except that sulfur of 5 wt % was further added instead of the solid superacid. That is, the cathode according to the comparative example contains sulfur of 60 wt %.

As a counter electrode (also a reference electrode), a lithium metal foil punched with a diameter of 14 mm was used. As a separator, a PE film was used. As an electrolytic solution, a mixed solution of 1M LiTFSI and DME/DOL 8:2 v/v with 0.2M $LiNO_3$ added was used.

A case (model CR2032 of SUS Corporation) was used, and the separator was immersed in the electrolytic solution between the working electrode and the counter electrode. As a result, the lithium-sulfur secondary battery according to each of the embodiment and the comparative example was obtained.

Thereafter, charge/discharge reactions were performed at 0.1 C in the range of 1.7 to 2.6V (vs. Li+/Li) under the condition of 25° C., and the lifetime was evaluated at 0.5 C.

Figure 5:
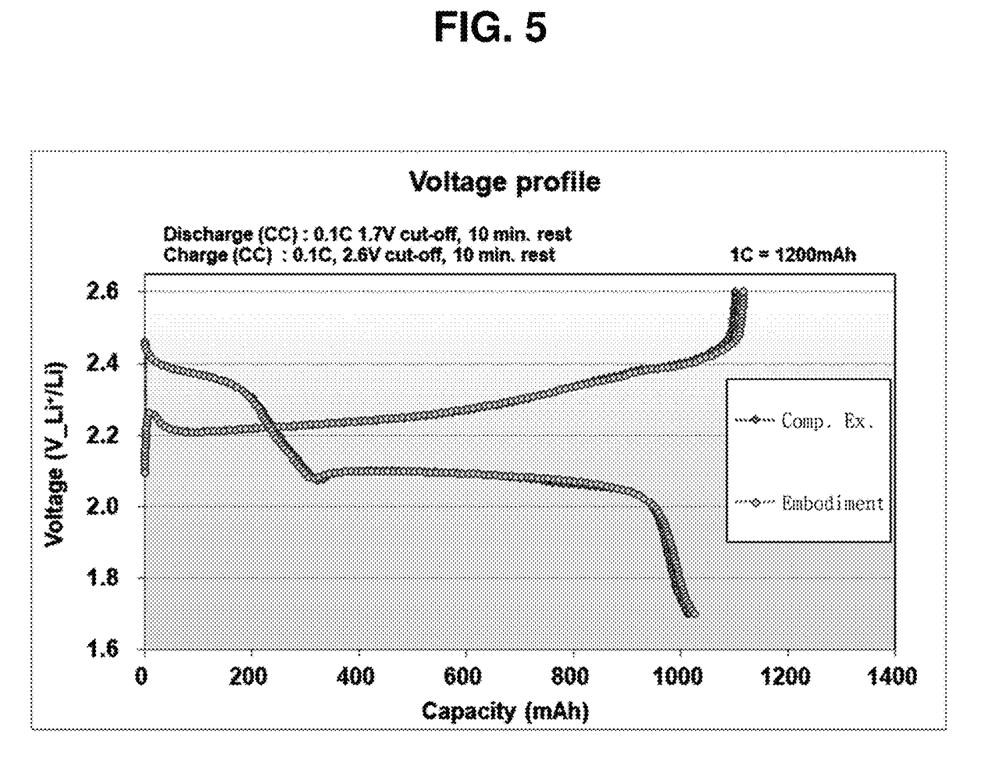
FIG. 5 is a graph showing charge/discharge curves of a lithium-sulfur secondary battery according to a comparative example and an embodiment of the present invention.

FIG. 5 is a graph showing charge/discharge curves of a lithium-sulfur secondary battery according to a comparative example and an embodiment of the present invention.

As shown in FIG. 5, a discharge capacity was measured equally as about 1060 mAh/g in each of the comparative example and the embodiment. Therefore, it was seen that the presence or not of a solid superacid had no influence on the capacity-per-mass implementation of the battery.

Figure 6:
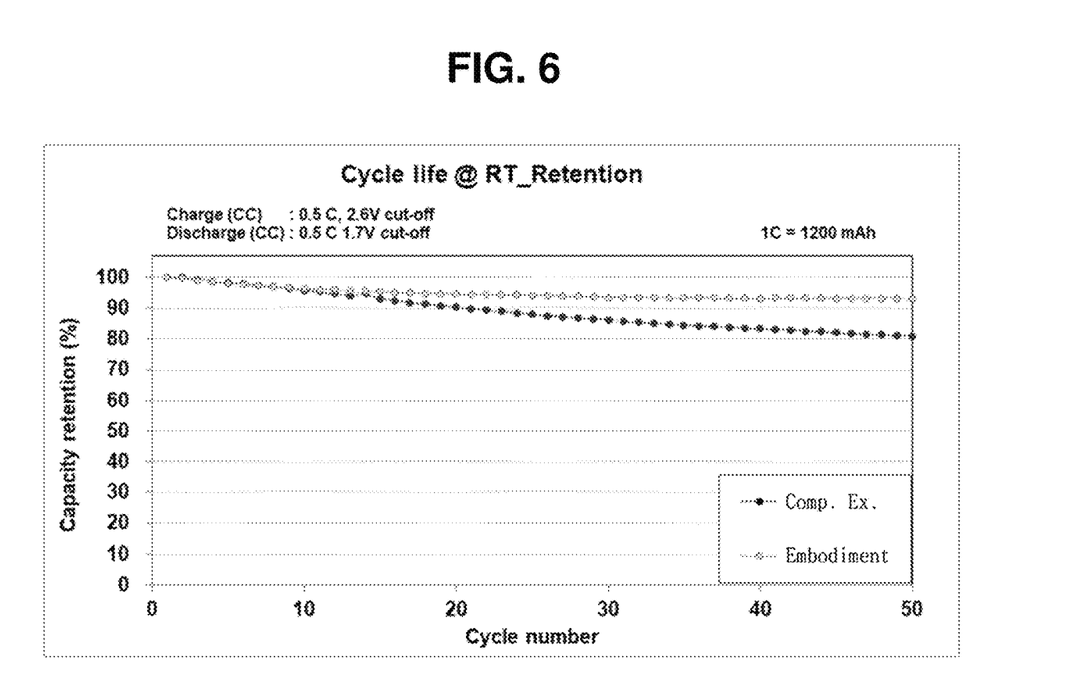
FIG. 6 is a graph showing lifetime properties of a lithium-sulfur secondary battery at room temperature according to a comparative example and an embodiment of the present invention.

FIG. 6 is a graph showing lifetime properties of a lithium-sulfur secondary battery at room temperature according to a comparative example and an embodiment of the present invention. In particular, the 0.5 C lifetime properties were compared at room temperature between the comparative example and the embodiment.

As shown in FIG. 6, when charge/discharge reactions were repeated 50 times in each of the comparative example and the embodiment, the effect of improving the lifetime properties by the solid superacid was observed as about 80% in case of the comparative example and as about 90% in case of the embodiment. This seems to be caused by the solid superacid of controlling polysulfide.

As a result of evaluating the electrochemical properties and long-term lifetime properties of the lithium-sulfur secondary battery according to the present invention, it can be seen that it is possible to utilize sulfur itself as the cathode active material without any technical processing since the solid superacid in the cathode does not affect the electrochemical properties of the cathode containing sulfur. Also, it is possible to minimize a reduction in the energy density of the lithium-sulfur secondary battery.

In addition, the solid superacid in the cathode can improve the long-term lifetime properties of the lithium-sulfur secondary battery by controlling the polysulfide which is an intermediate product of the charging/discharging reactions of lithium and sulfur.

While this disclosure has been particularly shown and described with reference to an exemplary embodiment thereof, it will be understood by those skilled in the art that various changes in form and details may be made therein without departing from the scope of the present invention as defined by the appended claims.

What is claimed is:

1. A cathode for a lithium-sulfur secondary battery, the cathode containing sulfur and a solid superacid.

2. The cathode of claim 1, wherein the solid superacid is contained with a weight percent of 1 to 10 and is a powder having a particle size of 3 micrometers or less.

3. The cathode of claim 2, wherein the sulfur is contained with a weight percent of 50 to 80.

4. The cathode of claim 3, further containing a conductive material with a weight percent of 7 to 25 and a binder with a weight percent of 7 to 25.

5. The cathode of claim 1, wherein the solid superacid includes sulfated zirconia, sulfated titanium dioxide, sulfated tin dioxide, or sulfated aluminum oxide.

6. A cathode structure for a lithium-sulfur secondary battery, the cathode structure comprising:
   a current collector; and
   a cathode formed on the current collector and containing sulfur and a solid superacid.

7. The cathode structure of claim 6, wherein the cathode contains the solid superacid with a weight percent of 1 to 10 and the sulfur with a weight percent of 50 to 80, and
   wherein the solid superacid is a powder having a particle size of 3 micrometers or less.

8. The cathode structure of claim 7, wherein the cathode further contains a conductive material with a weight percent of 7 to 25 and a binder with a weight percent of 7 to 25.

9. The cathode structure of claim 6, wherein the solid superacid includes sulfated zirconia, sulfated titanium dioxide, sulfated tin dioxide, or sulfated aluminum oxide.

10. A lithium-sulfur secondary battery comprising a cathode containing sulfur and a solid superacid.

11. The lithium-sulfur secondary battery of claim 10, wherein the cathode contains the solid superacid with a weight percent of 1 to 10 and the sulfur with a weight percent of 50 to 80, and
   wherein the solid superacid is a powder having a particle size of 3 micrometers or less.

12. The lithium-sulfur secondary battery of claim 11, wherein the cathode further contains a conductive material with a weight percent of 7 to 25 and a binder with a weight percent of 7 to 25.

* * * * *